(12) United States Patent
Blair et al.

(10) Patent No.: US 6,414,767 B1
(45) Date of Patent: *Jul. 2, 2002

(54) MESHED OPTICAL NETWORK

(75) Inventors: Loudon T Blair, Annapolis, MD (US); Fiona MacKenzie; Jonathan R Armitage, both of Ipswich (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,079
(22) PCT Filed: Dec. 12, 1996
(86) PCT No.: PCT/GB96/03085
§ 371 (c)(1),
(2), (4) Date: May 4, 1998
(87) PCT Pub. No.: WO97/22190
PCT Pub. Date: Jun. 19, 1997

(30) Foreign Application Priority Data

Dec. 13, 1995 (EP) .............................. 95309094

(51) Int. Cl.[7] .............................. H04B 10/20
(52) U.S. Cl. .................. 359/119; 359/118; 385/17; 370/424
(58) Field of Search .................. 359/119, 113, 359/115, 118, 121, 117, 127, 120, 128; 385/17; 370/424, 404, 452, 460

(56) References Cited

U.S. PATENT DOCUMENTS

| 4,630,256 | A | * | 12/1986 | Albanese | 359/125 |
| 4,704,713 | A | * | 11/1987 | Haller et al. | 359/119 |
| 4,715,027 | A | * | 12/1987 | Mahapatra et al. | 359/130 |
| 5,043,975 | A | | 8/1991 | McMahon | 359/128 |

FOREIGN PATENT DOCUMENTS

EP 0 614 291 9/1994

OTHER PUBLICATIONS

Supercomm/ICC '92, Discovering a New World of Communications, Chicago, IL, USA, Jun. 14–18, 1992, New York, NY, USA, IEEE, USA, pp. 1173–1179, vol. 3 Wagner et al, "Multiwavelength ring networks for switch consolidation and interconnection".

IEE Proceedings J. Optoelectronics, vol. 142, No. 5, Oct. 1, 1995, pp. 219–224, Tachikawa et al, "New Functional Multiaddress Channel Selective Terminal Using an Arrayed Waveguide Grating Multiplexer with Cross–Connect Loopback Paths".

Electronics Latters, Dec. 3, 1992, UK, vol. 28, No. 25, pp. 2340–2341, Elrefaie et al, "Fibre amplifiers in closed–ring WDM networks".

Willner et al., "Optical–Amplified WDM Ring Network Incorporating Channel–Dropping Filters", IEEE Photonics Technology Letters, vol. 6, No. 6, Jun. 1994, pp. 760–763.

(List continued on next page.)

Primary Examiner—Jason Chan
Assistant Examiner—Christina Y Leung
(74) Attorney, Agent, or Firm—Nixon & Vanderhye PC

(57) ABSTRACT

An optical network includes interconnected via an N×N WDM router. The nodes are connected to an optical waveguide ring having a duplex structure. A first set of optical waveguides connects the transmitters in the nodes and a second set of optical waveguides connects the receivers in the nodes. The N×N wavelength router is connected across the ring between the first set of optical waveguides and the second set of optical waveguides. Each of the nodes is able to communicate with any other of the nodes on a respective wavelength channel via the router.

10 Claims, 9 Drawing Sheets

OTHER PUBLICATIONS

Santoro et al., "Experimental and Theoretical Performance of Ring–Shaped Passive–Bus Optical Networks", IEEE Photonics Technology Letters, vol. 3, No. 5, May 1991, pp. 490–492.

Way et al., "A Self–Routing WDM High–Capacity SONET Ring Network", IEEE Photonics Technology Letters, vol. 4, No. 4, Apr. 1992, pp. 402–405.

Hemenway et al., "A 20–Channel Wavelength–Routed All–Optical Network Deployed in the Boston Metro Area", pp. PD8–2–PD8–5.

Oda et al., "An Optical FDM–Add/Drop Multiplexing Ring Network Utilizing Fiber Fabry–Perot Filters and Optical Circulators", IEEE Photonics Technology Letters, vol. 5, No. 7, Jul. 1993, pp. 825–828.

Tholey et al., "Demonstration of WDM Survivable Unidirectional Ring Network Using Tunable Channel Dropping Receivers", Electronics Letters, vol. 30, No. 16, Aug. 4, 1994, pp. 1323–1324.

Okamoto et al., "Fabrication of 64×64 Arrayed–Waveguide Grating Multiplexer on Silicon", Electronics Letters, vol. 31, No. 3, Feb. 2, 1995, pp. 184–186.

Alexander et al., "A Precompetitive Consortium on Wide–Band All–Optical Networks", Journal of Lightwave Technology, vol. 11, No. 5/6, May/Jun. 1993, pp. 714–732.

Wisely, "32 Channel WDM Multiplexer With 1 nm Channel Spacing and 0.7 nm Bandwidth", Electronics Letters, vol. 27, No. 6, Mar. 14, 1991, pp. 520–521.

* cited by examiner

MESHED OPTICAL NETWORK

BACKGROUND OF THE INVENTION

1. Field of the Invention

The present invention relates to an optical network, and in particular to a network capable of providing fully meshed interconnection of a number of nodes. Such a network might be used, for example, for telecommunications or data communications.

2. Description of Related Art

In a fully interconnected network, each port of a given node is able to obtain direct connection to every other node. Such an interconnection scheme might be implemented by providing direct optical fibre connections between the output ports of a given node and every other node on the network and input port. For example, in a network with 4 nodes, node 1 would have three output ports with direct fibre connections to nodes 2, 3 and 4 respectively, and would have three input ports with further direct fibre connections from the outputs of nodes 2, 3 and 4, with similar patterns of connection for the other nodes. Such an interconnection scheme however suffers from a scalability problem. Adding a new node requires the addition of 2N fibre links, where N is the new total number of nodes. This necessitates a great deal of re-wiring and becomes more and more difficult to achieve as N becomes large.

It has previously been proposed to address the wiring and scalability problems of a full spatial interconnect by using wavelength division multiplexing (WDM) to provide additional "virtual paths" over a reduced number of physical connections. By using WDM, the number of fibres F required to mesh fully N nodes can be reduced to: F=2N. In practice a little more than the minimum number of fibres may be used to achieve an optimum balance between the wavelength and spatial multiplex. "A Precompetitive Consortium on Wide-Band All-Optical Networks", S B Alexander et al, Journal of Lightwave Technology, Vol 11 No.5/6 May/June 1993, pp 714–732, discloses one example of a meshed network using an N×N wavelength router. The router in this example is located at the hub of a star network. While such an arrangement provides the desired degree of interconnection using a simplified topology and with improved scalability, it still suffers a number of disadvantages. In particular such a network lacks resilience, that is there is a serious loss of performance if damage occurs either at the central router, or on any of the lengths of fibre between the nodes and the router.

According to a first aspect of the present invention there is provided an optical network comprising:

a) a plurality of nodes;
b) at least one optical waveguide ring which is connected to the nodes, and which has a duplex structure and comprises:
   i) a first set of optical paths which connect transmitter sides of the plurality of nodes; and
   ii) a second set of optical paths which connect receiver sides of the plurality of nodes; and
c) a WDM router which has a plurality of inputs and a plurality of outputs and which is connected between the first set of optical paths and the second set of optical paths, in use, each of N nodes, where N is an integer greater than 1, communicating with any other one of the N nodes on a respective wavelength channel via the said WDM router.

The present invention provides a network which physically has a ring topology, while logically providing a star mesh interconnection. This arrangement is found to provide increased robustness and reliability and also facilitates physical implementation of the network. Such a network might be used, for example, to interconnect the core nodes of the national PSTN system.

Preferably each of the nodes is connected to the ring via a 1×2 switch, the different ring-side ports of the switch being arranged to transmit or receive signals with different respective directions of progagation around the ring. Preferably each node is arranged to control the switch automatically to select the other of the ring-side ports when communication on the ring via one of the ports is interrupted.

In a network embodying the present invention, a transmitter, for example, in a given node can transmit a signal to the router and onto any other node via one of two possible paths—a first path progagating in a clockwise direction and a second path propagating in the anti-clockwise direction. The robustness of the network can be further improved by connecting each node to the duplex ring via 1×2 switches which can be used to select one or other of the alternative paths. Accordingly, a break in just one path between the router and the node is not sufficient to interrupt communication, since the other path remains available. The switching between alternative paths may be carried out automatically under local control of the node, but might alternatively be implemented in response to remotely generated network management signals. As a further alternative, each node may be connected to transmit/receive signals in both directions. In this case switches for the selection of one of the directions are located centrally at the router and are operated when a break is detected in communications in one direction.

Preferably the ring comprises a first set of N fibres, each fibre being connected to the transmitter output of a respective node, and to a respective one of N input to the router, and a second set of fibres, each fibre of the second set being connected to a respective one of N outputs of the N×N router and to a respective receiver input.

Preferably the WDM router comprises a passive wavelength multiplexer/demultiplexer.

The use of a passive router is preferred as providing robustness with minimal control overheads for the network.

BRIEF DESCRIPTION OF THE DRAWINGS

Examples of systems embodying the present invention will now be described in further detail, by way of example only, with reference to the accompanying drawings, in which.

DETAILED DESCRIPTION OF EXEMPLARY EMBODIMENTS

Figure 1:
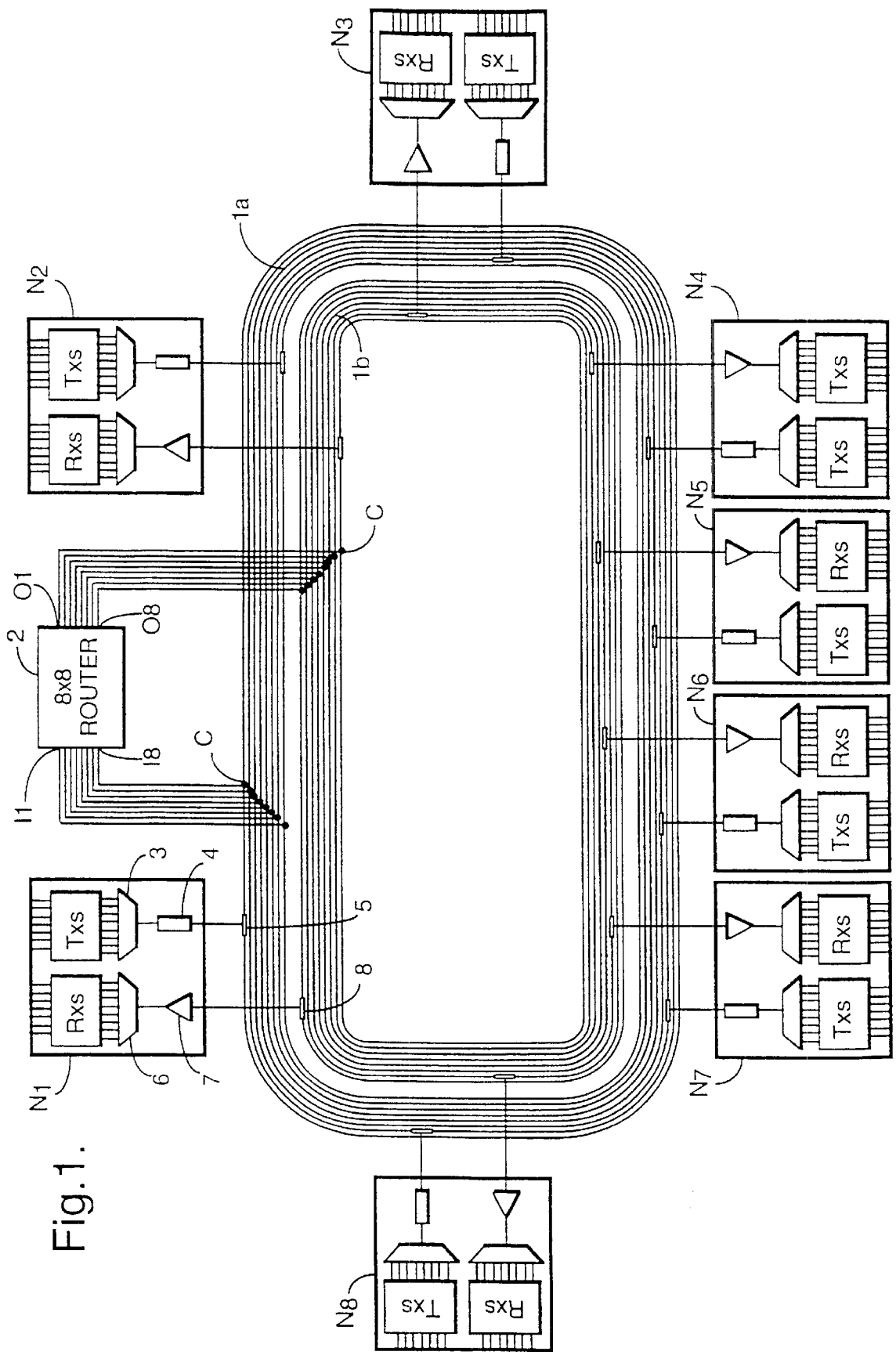
FIG. 1 is a schematic of a ring network embodying the present invention.

An optical network comprises eight nodes N1–N8 connected to optical waveguides 1A, 1B physically configured as a duplex ring. An 8×8 WDM router 2 is connected to the ring with its input side connected to the set of waveguides 1A making up the first half of the duplex ring and its output side connected to the set of waveguides 1B making up the second half of the duplex ring. Specifically, each of the eight inputs to the router I1–I8 is connected via a 50:50 coupler C to a corresponding one of the optical fibres in the first set of waveguides 1A, and on the output side each of 8 outputs O1–O8 is connected via a coupler C to a corresponding one of the eight fibres in the second set of optical waveguides 1B.

The network might be used, for example as a LAN or WAN for interconnecting computer systems, or as a telecommunications network, in which case the node transmitters/receivers are used to add/drop telecommunications traffic from a respective network switch.

Each of the nodes N1–N8 includes a receiver stage Rxs and a transmitter stage Txs. The transmitter stage Txs is connected via an optical multiplexer 3 and a broadband optical isolater 4 to the input port of a 1×2 protection switch 5. The optical isolator protects against spurious back-reflection. The two output ports of the protection switch 5 are both connected to a respective one of the first set of waveguides 1A. One of the two output ports directs an optical signal onto the ring propagating in one sense, for example clockwise, and the other output port directs the signal in the opposite sense, for example anti-clockwise. The receiver stage Rxs is connected to a respective one of the second set of optical fibres 1B via an optical demultiplexer 6, an erbium-doped fibre amplifier 7 and a 1×2 protection switch 8. As for the protection switch for the transmitter stage, the switch coupling the receiver to the waveguides is arranged to select one or other of the two directions of propagation around the ring. The nodes N1–N8 may be, for example, network interface units connecting the core network to a wider system, such as the national PSTN, and may handle a wide variety of traffic from audio telephony to broadband multimedia services.

Figure 10:
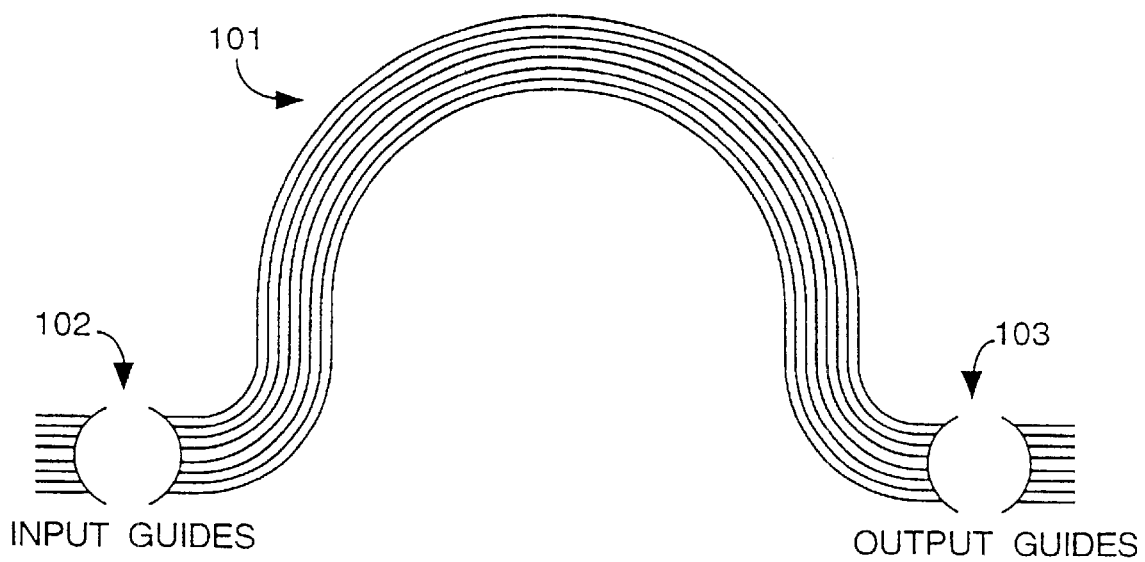
FIG. 10 is a schematic diagram of an 8×8 phased array grating router.

In use, the network functions logically as a star network using spatial/wavelength multiplexing. Each of the nodes is equipped to transmit on eight wavelength channels via its respective fibre to the router 2. Each node is also equipped to receive and demultiplex eight wavelength channels. Seven of these wavelengths are used for forming connections to or from the seven other nodes in the network. The eighth wavelength is used for management and control purposes. At the router 2, a signal from a given node is routed to a selected one of the other nodes according to the wavelength of the incoming signal. An appropriate 8×8 routing table is shown in FIG. 10, together with a phased array grating used in the router to perform the routing function. This is preferably formed as a planar silica-on-silicon device, as described in K. Okamoto et al, "Fabrication of 64×64 arrayed-waveguide grating multiplexer on silicon", Electron.Lett.31(3), 184–186, February 1995. It will be seen from the routing table that $\lambda_0$ routes a signal from a given node back to the same node. Since it is assumed that this routing path will not in practice be required, this channel is used for the transmission of control management information between each node and a central network management application. It is also preferably used as the reference wavelength for the nodes. Power may be tapped on and off at $\lambda_0$ at the router allowing the wavelength to be used for low frequency signalling between the network management application located at the router and the nodes.

The nodes include detection and control circuitry which continually monitors the status of the different wavelength channels. If an interruption is detected on a given channel then the 1×2 protection switch is switched by the node to select the alternative direction for both transmission and reception. In this way, the network can continue functioning even if there is a break at one point in the ring.

Although the example described above uses an 8×8 configuration, it will be understood that different numbers of nodes and channels may be used, for example a 4×4 system or a 16×16 system. However, as the number of channels increases, crosstalk between channels becomes an increasingly serious problem. Accordingly, using current Si-on-SiO$_2$ technology, and with a preferred channel spacing of 1.6 nm, 8×8 represents the maximum no. of ports. Alternatively the router might be implemented using micro-optic couplers as exemplified in "32-channel WDM Mux with 1 nm channel spacing and 0.7 nm Bandwidth," D. R.Wisely, Electronics Letts. Vo. 27, p 520. In such a router the intra-channel crosstalk is inherently much lower than in planar optic devices. Higher network dimensions such as 32×32 or 64×64 are therefore possible using such technology.

The implementation of the network, and the different components used, will now be described in further detail.

At each node or NIU, the incoming eight wavelengths are demultiplexed and received by eight separate detectors. Similarly eight output lasers are multiplexed onto a single outgoing fibre. The NIU can be broken down into five functional units which may, for example, be housed in five separate 19 inch rack units. The units are: transmitter unit, switch unit, receiver unit, mux/demux unit and mux/demux control unit. These units are described in further detail below.

The whole network has, in this example, been designed for operation at 2.5 G bit/s on each wavelength—a total network capacity of around 140 G bit/s. Each of the links provides a transparent channel up to a bit-rate determined by the link power budget, and can use any one of a variety of protocols. Only the peripheral electronics limit the network's ability to carry specific data formats, e.g. FDDI, FCS and other proprietary protocol. In the present example it is assumed that the data format is ATM. In this example, each wavelength carries digital baseband data and subcarrier data in the GHz region. These subcarrier channels are used, for example, for analog PAL for video conferencing, for radio LAN traffic, or for digital data. Link reconfiguration in the network is carried out via electronic cross-bar switches at each NIU. The management of these switches is coordinated by the central network management system, which also deals with fault management. Control systems are also provided for wavelength control and active stabilization of the mux/demux pairs and the central 8×8 router.

The detailed functional design of the NIU and of the router will now be described.

Figure 2:
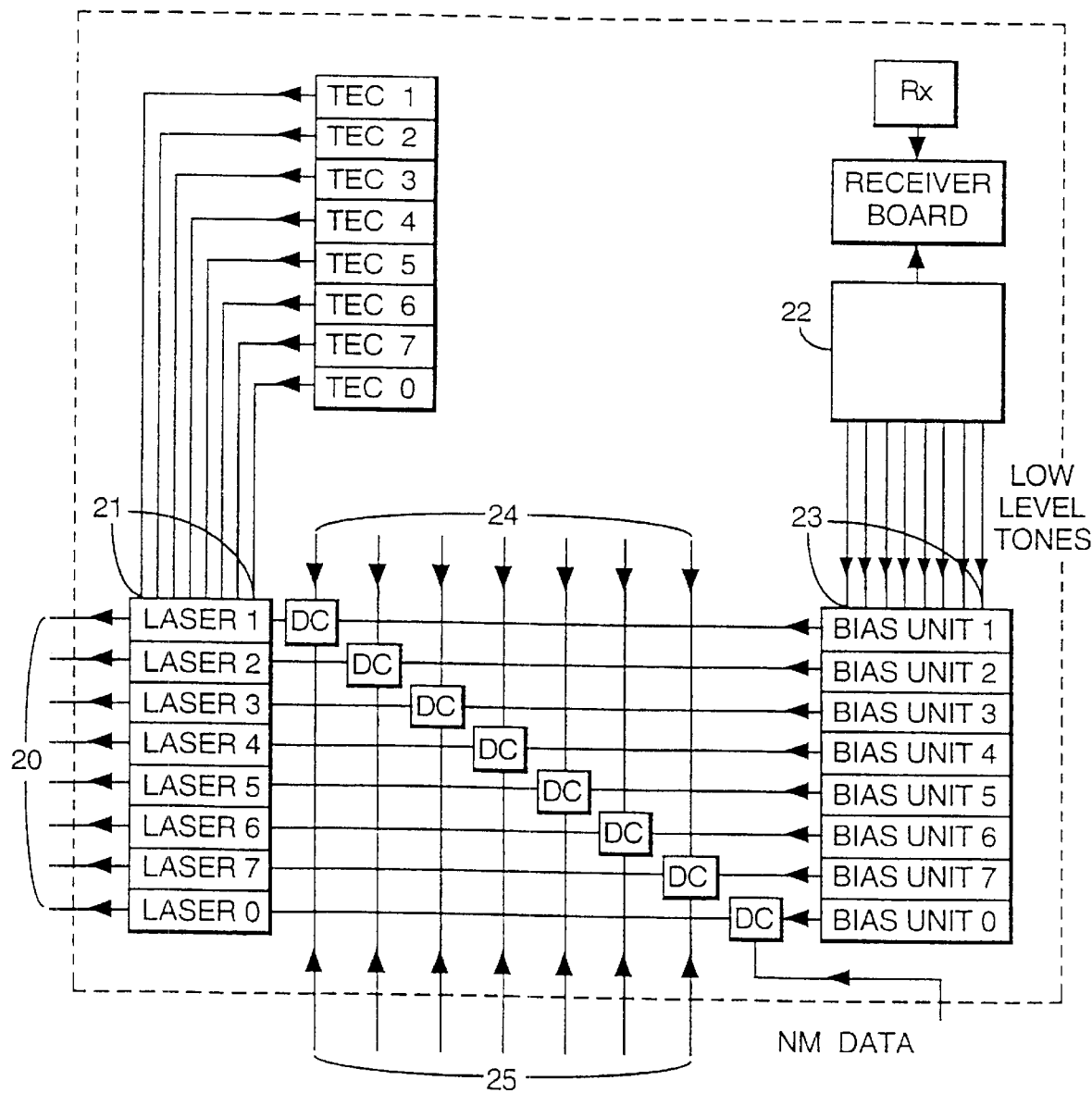
FIG. 2 shows the transmitter unit of one of the nodes of FIG. 1.

1. Transmitter Unit (FIG. 2)

This unit consists of 8 cards, each of which contains one DFB laser 21 with drive circuitry and TEC (Thermo-Electric Cooler) and a further card containing the tone generation and receiving circuits.

The drive circuits for the eight TEC units, are essentially standard units each capable of delivering a maximum of 250 mA current. The feedback control for the eight TEC units is from the thermistor within the laser diode package and locks the laser wavelengths to the transmission maximum of the multiplexer. However in addition a separate voltage source can drive the TEC temperature say two degrees either side of this manually set temperature. This means that the laser wavelength can be set remotely, allowing wavelength locking under software control.

The tone generator, a reference frequency board 22, generates eight sine waves whose frequencies have a one-to-one correspondence to the laser wavelengths. These sine waves are then passed down the backplane onto the eight low frequency bias units 23. The amplitude of the oscillating component of the laser bias current is set on the laser drive board. The low speed receiver (bandwidth<20 kHz) picks up the low frequency tones of the eight wavelength laser after transmission through the Mux, and generates dc voltages proportional to the respective tone amplitudes using synchronous detection. These eight voltages (which are proportional to the power levels in the eight wavelengths) can be used as part of an automatic feedback loop to lock the laser tempartures. Each of these eight voltages can be displayed on the front panel LCD unit.

The major components of this unit are the eight laser bias units, each on a separate card. These are conventional dc bias units, except that imposed upon each bias current is a low frequency oscillation whose frequency can be set to a value which has a one-to-one correspondence between it and the laser wavelength. The dc+digital baseband and the subcarrier electrical signals are combined in a high-speed passive splitter and fed into the side of the laser transmitter. All the electrical data fed into the two SMA inputs on the front panel needs to be buffered through amplifiers to protect against spikes and against inadvertant reverse biasing of the laser. This is done on the main board and fed via a flexible SMA lead to the laser. Network management data is sent to the central Network Management Hub on wavelength 0.

The digital baseband inputs and sub-carrier inputs are referenced 24 and 25 respectively. Eight optical fibres take optical outputs 26 to the multiplexer unit.

Figure 3:
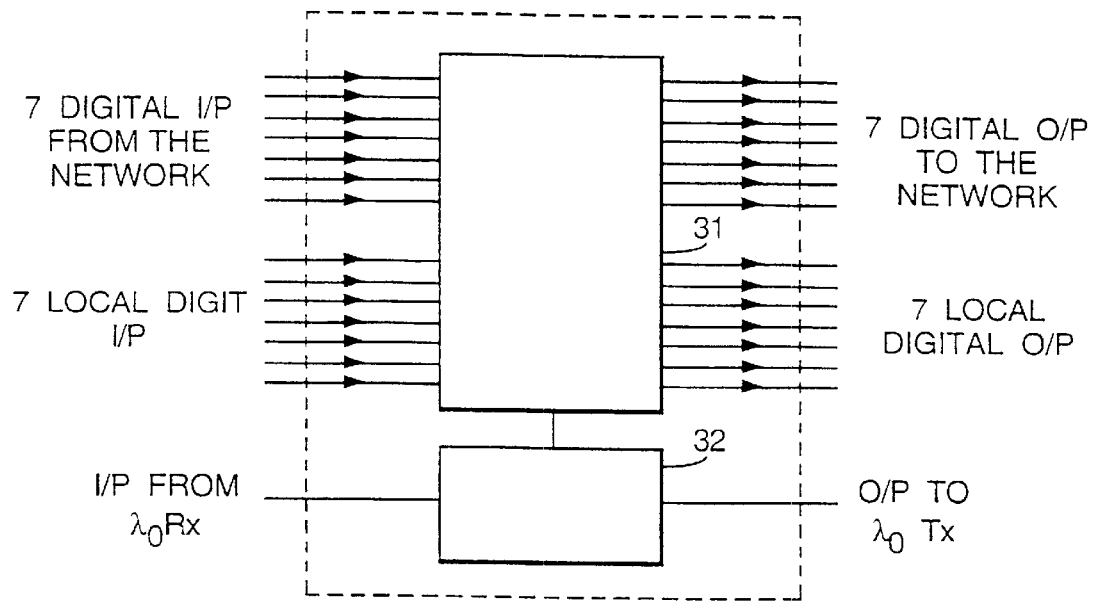
FIG. 3 shows a switch unit in one of the nodes.

2. Switch Unit (FIG. 3)

This unit simply contains the electronic switch 31 itself, and a control board 32. This control board takes inputs from the $\lambda_0$ Rx and possibly reports its status back to the $\lambda_0$ transmitter for transmission back up to the central Network Management Application (NMA).

The unit includes an electrical input from the $\lambda_0$ Receiver (either carrying digital data on a subcarrier or digital baseband from the central NMA).

The set up of the switch connections has to be done by a computer. To implement fault and diagnostic reporting to a central NMA, a micropocessor unit sits somewhere on this node, and takes inputs from all the other racks at the NIU and from the electronics switch and report them over an RS-232 channel to the central NMA. This transmission will be over a unique frequency sub-carrier transmisson. This microprocessor may be a cheap 286 or 386 PC with a serial RS-232 and digital I/O cards.

In this example, the switch 31 is a 14×14 reconfigurable electronic crossbar switch.

Figure 4:
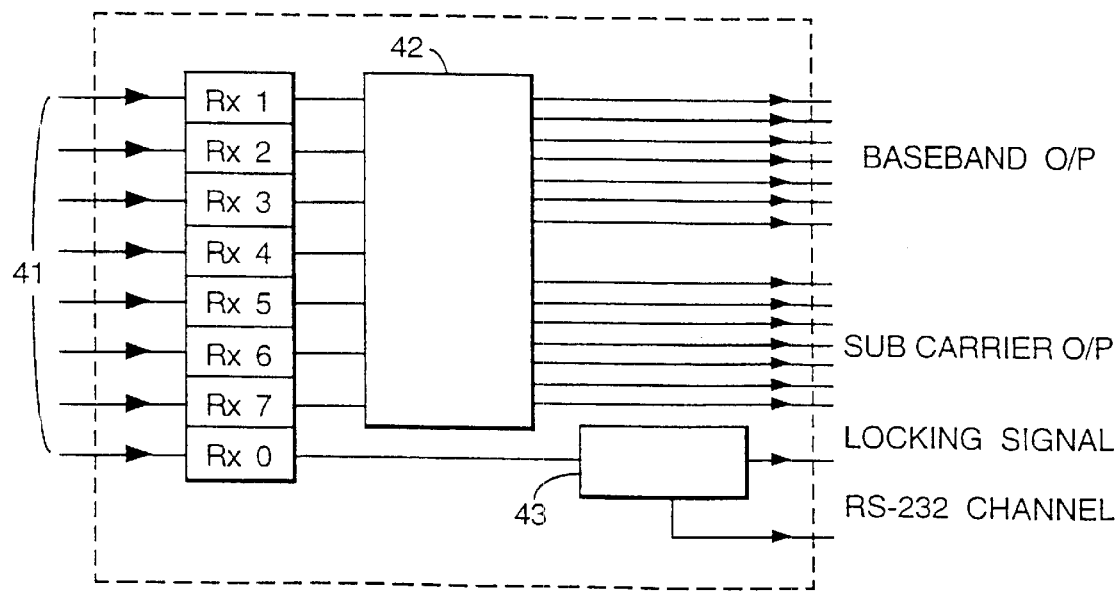
FIG. 4 shows a receiver unit in one of the nodes.

3. Receiver Unit (FIG. 4)

All the eight individual receivers 41 from BT&D have a bandwidth for 2.5 Gbit/s operation. The electrical filter array 42 separates out the baseband digital signals from the sub-carrier channels. Channel 0 is slightly different, the data is carried digitally or on a subcarrier. The dc component is simply used to set the temperature of the mix/demux unit to lock it to the $\lambda_0$ wavelength distributed from the central hub. Gain control for the receiver units may be done manually using a potentiometer on the front panel. Alternatively, an AGC feedback loop may be used to control the internal second stage gain of the BT&D receivers. The Photodiode bias currents for the eight receivers are measured, and effectively used as a power monitor.

Channel 0 passes through a separate respective electrical filter 43. The outputs from the filter comprising a locking signal for the MUX/DEMUX and an RS-232 channel for NMA.

Figure 5:
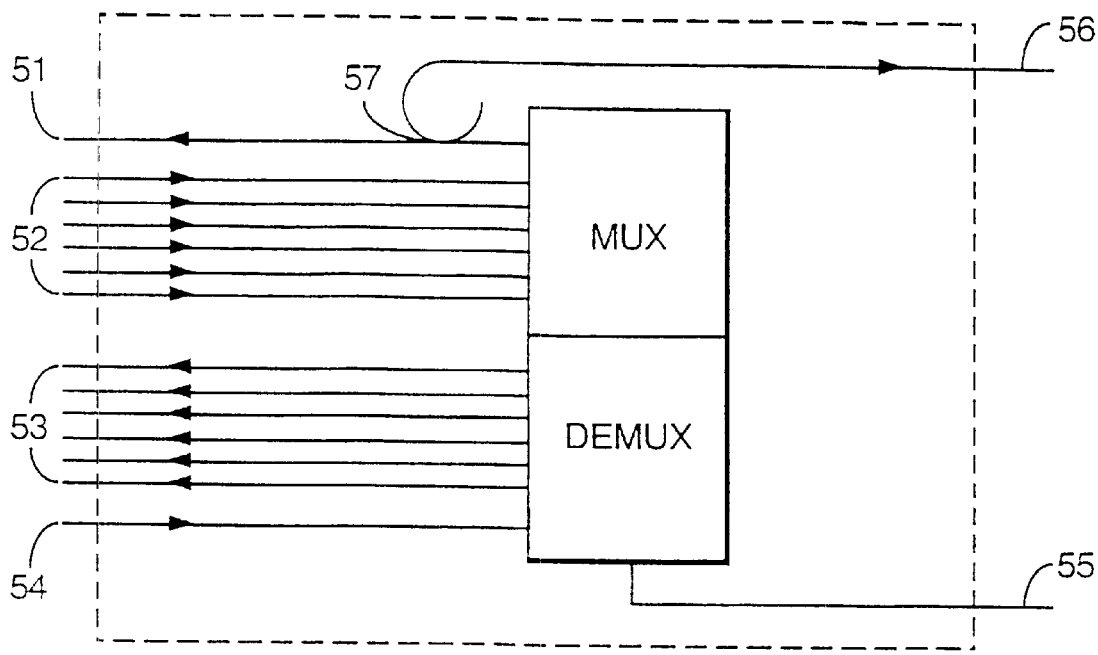
FIG. 5 shows a mux/demux unit in one of the nodes.

4. Mux/demux Unit (FIG. 5)

The example shown in this Figure is an opto-mechanical device using a grating which is rotated under the control of piezoelectric drivers. This unit is mainly passive containing only optical components, plus a temperature stabilisation kit, driven and controlled by the mux/demux control unit. It requires no power supply as the power is supplied from the Mux/demux control Unit. The dc signal at the $\lambda_0$ receiver in unit 2 reaches a maximum when the wavelength of the mux/demux pair is aligned to the reference wavelength. Two simple lock-in type circuits dither the two PZTs (Piezo Electric Transducers) on the mux/demux to lock onto this maximum.

The inputs/outputs shown are: output fibre to the network 51; input fibre from the laser array 52; output fibre to the receiver array 53; input fibre from the network 54; electrical input from the PZT amplifier in mux/demux control unit 55; and output fibre to the laser wavelength control unit 56. This last is tapped via a 90:10 coupler 57.

Figure 6:
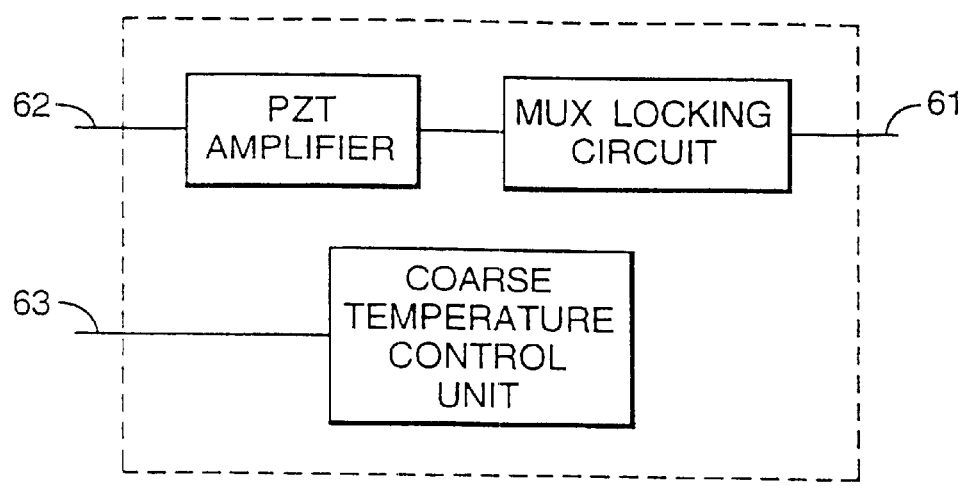
FIG. 6 shows a mux/demux control unit in one of the nodes.

5. Mux/demux Control Unit (FIG. 6)

This unit contains the PZT feedback control loops and the temperature control circuitry for the Mux/demux unit. The input 61 from the wavelength 0 receiver reaches a maximum when the wavelength channels of the Mux/demux pair are aligned to the reference wavelength. Two simple lock-in type circuits dither the two PZTs on the mux/demux a lock onto this maximum. The coarse temperature control unit only needs to maintain the temperature of the mux/demux unit to between 20 and 30 degrees.

A high voltage output 62 and a temperature control output 63 go to the mux/demux unit.

Figure 7:
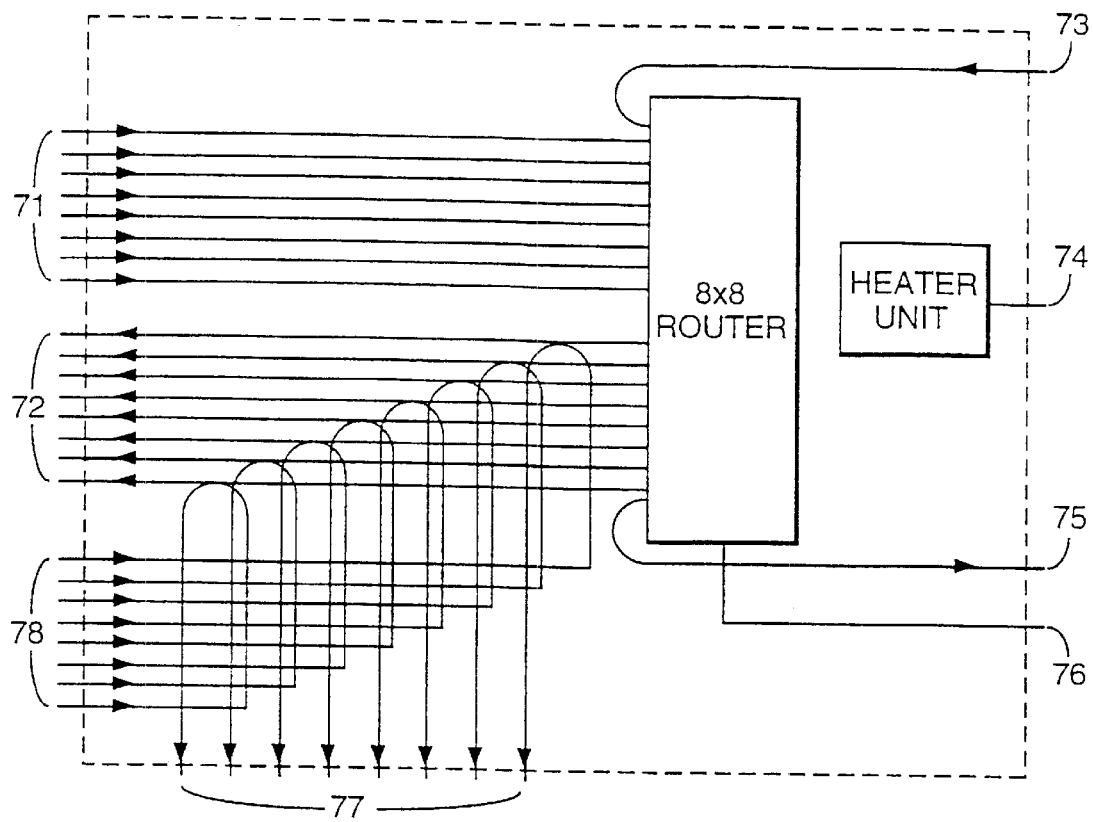
FIG. 7 is a schematic of the router of FIG. 1.

6. Router Unit (FIG. 7)

This unit is mainly passive containing only optical components, plus the heating unit which is controlled from the router control unit. It requires no power supply as all the power is supplied from the Router control Unit. The two other fibre connections carry the reference wavelength generated within the router control unit and are used to provide the control signal for locking the router. This signal is then fed to the PZT amplifier and then back to the router. Depending on the precise format for sending data to and from the central NM application (i.e. RS-2323 or RS485 using digital baseband or subcarrier channels), the 8 I/P 71 and 8 O/P fibres 72 may need to be connected together via 1×8 splitters.

The input 73 is a fibre which carries a signal from the reference laser in the router control unit; heater current and feedback to the router control unit pass through connection 74 and fibre 75 carries the output to the router control unit; input 76 carries a high voltage input from the PZT amplifier. Outputs 78 and inputs 78 are connected to the central NMA.

Figure 8:
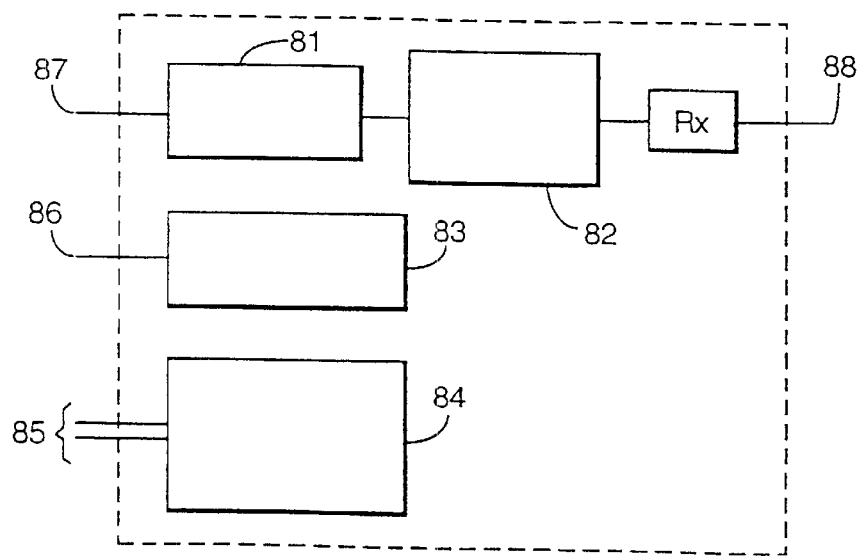
FIG. 8 shows a router control unit.

7. Router Control Unit (FIG. 8)

This unit contains the feedback control loops and the temperature control circuitry for the router unit. The optical input at the receiver reaches a maximum when the router wavelengths are aligned to the wavelength of the reference laser. Two simple lock-in type circuits should be able to dither the two PZTs on the router to lock onto this maximum.

The coarse temperature control unit only needs to maintain temperature to between 20 and 30 degrees.

Figure 9:
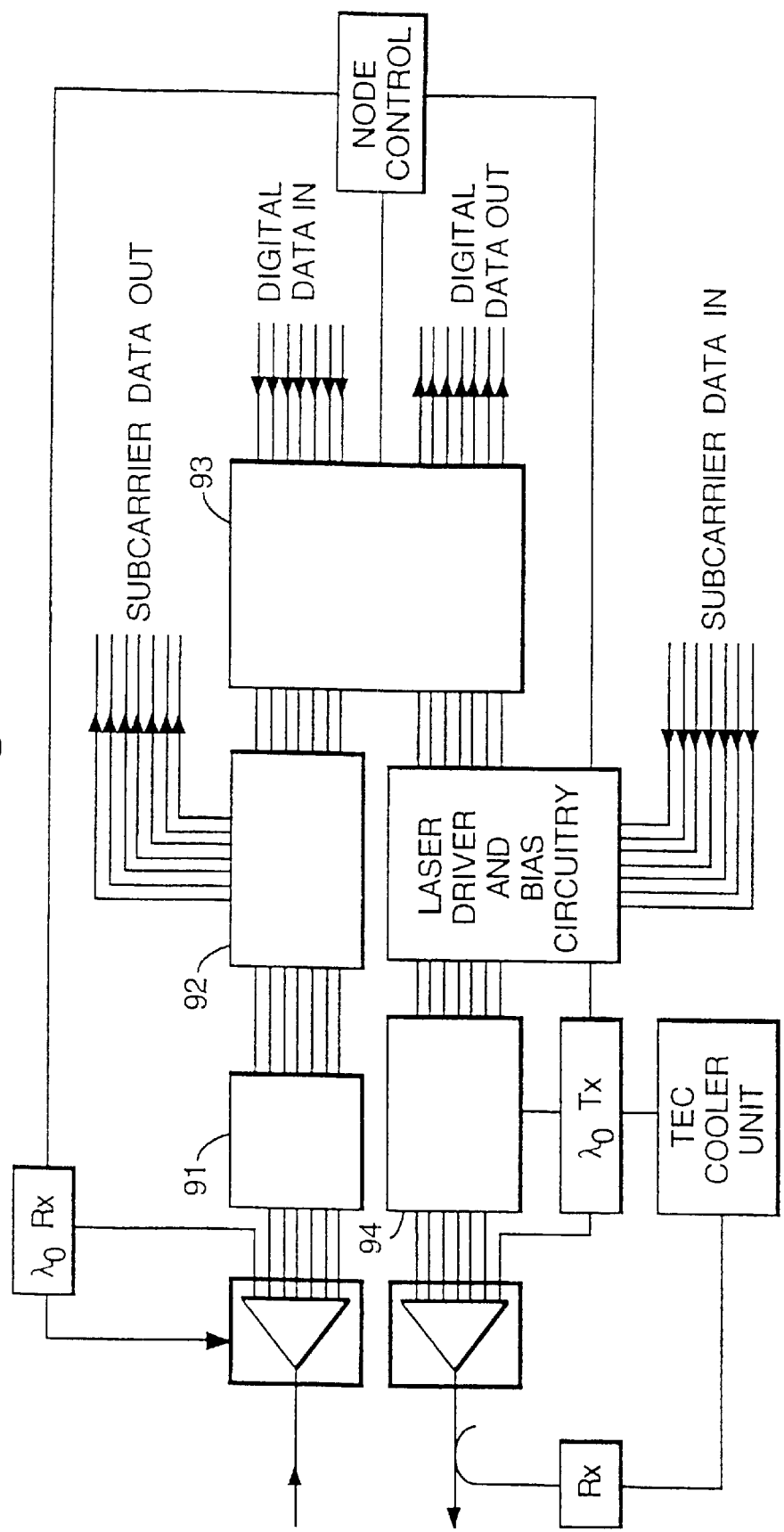
FIG. 9 is a schematic of one of the nodes.

FIG. 9 is a schematic showing the overall structure of an NIU. Automatic gain control AGC is used on the 2.4 GHz receiver array 91 to give a fixed output level of, say, 2V. Temperature control is used to ensure that wavelengths and the alignments of components around the network do not drift. A 2.4 GHz receiver is used to allow upgrading of the bitrate and also for carrying sub-carrier channels. In addition, on the receive side, the reference wavelength $\lambda_0$ is used to lock the mux/demux pair to the correct centre frequency. This wavelength is also used to carry management data from the network management application down to the eight physical layer nodes. On the transmit side, a 10% coupler is added after the multiplexer, and each of the transmit lasers NA high speed laser array 94 are modulated with low frequency tones which can be detected separately by the single-low speed receiver. By slowly modulating the temperature of the individual lasers, each of the laser wavelengths is locked onto the multiplexer, so that the lower wavelength coincides with the maximum transmission of the multiplexer.

In the figure, the block referenced 81 is the PZT amplifier, 82 is the routing locking circuit, 83 is the reference laser source, 84 is the coarse temperature control unit. Inputs 85 carry heater current and temperature feedback from the router unit. 86 is the fibre output to the router unit and 87 is the high voltage output to the router unit. 88 is the fibre input from the router unit.

On the receiver side of the NIU, immediately following the receiver 91, the digital baseband is separated from the sub-carrier channels using a suitable filter array 92. Optionally, an amplifier may be added at this stage depending on the power budget and required sensitivity.

A 14×14 electronic cross-connect 93 is used to allow reconfiguration of the node. Reconfiguration may be carried out, for example, depending on traffic levels. The switch is software controlled to allow the connection of each electrical input port and any given laser.

The network includes various control and management functions. The network may be provided with a central node management system, but in addition each node has its own local manager. As noted above, communication between the central network management system and the local node manager is carried out on wavelength $\lambda_0$, optionally using a unique subcarrier for each of the sixteen communication channels. Information which may be communicated upstream from the node to the central management system includes:

Are the lasers working?

Are the receivers working?

Is the multiplexer locked-up to wavelength $\lambda_0$?

Is the crossbar switch working O.K.?

Are all the electronic boards working O.K.?

Information sent downstream that is from the central network management system to the node local manager includes instructions for reconfiguration of the crossbar switch in response to changing traffic levels.

Tables 1 to 7 below provide a comprehensive listing of control and monitoring functions of the nodes and of the router (Table 6 is blank since in this implementation the router is an entirely passive device).

FIG. 10 is a schematic diagram which shows an 8×8 phased array grating suitable for use as a passive WDM router. A phased array 101 of waveguides has uniformly increased pathlengths between neighbouring guides. Input and output guides are connected to the phased array via star couplers 102, 103. Table 8 lists a routing table for this waveguide.

Figure 11:
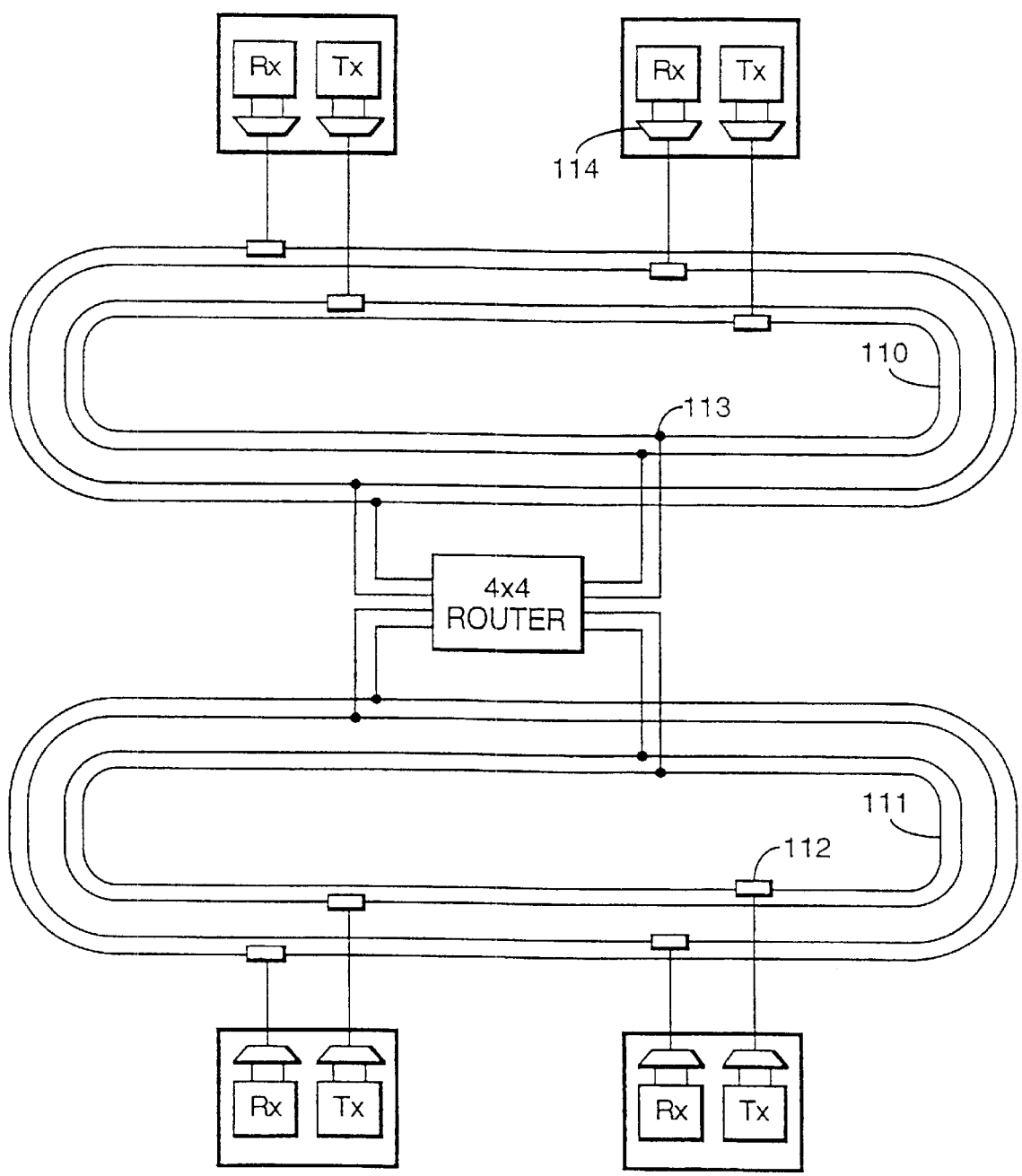
FIG. 11 is a schematic of an alternative embodiment.
Figure 12:
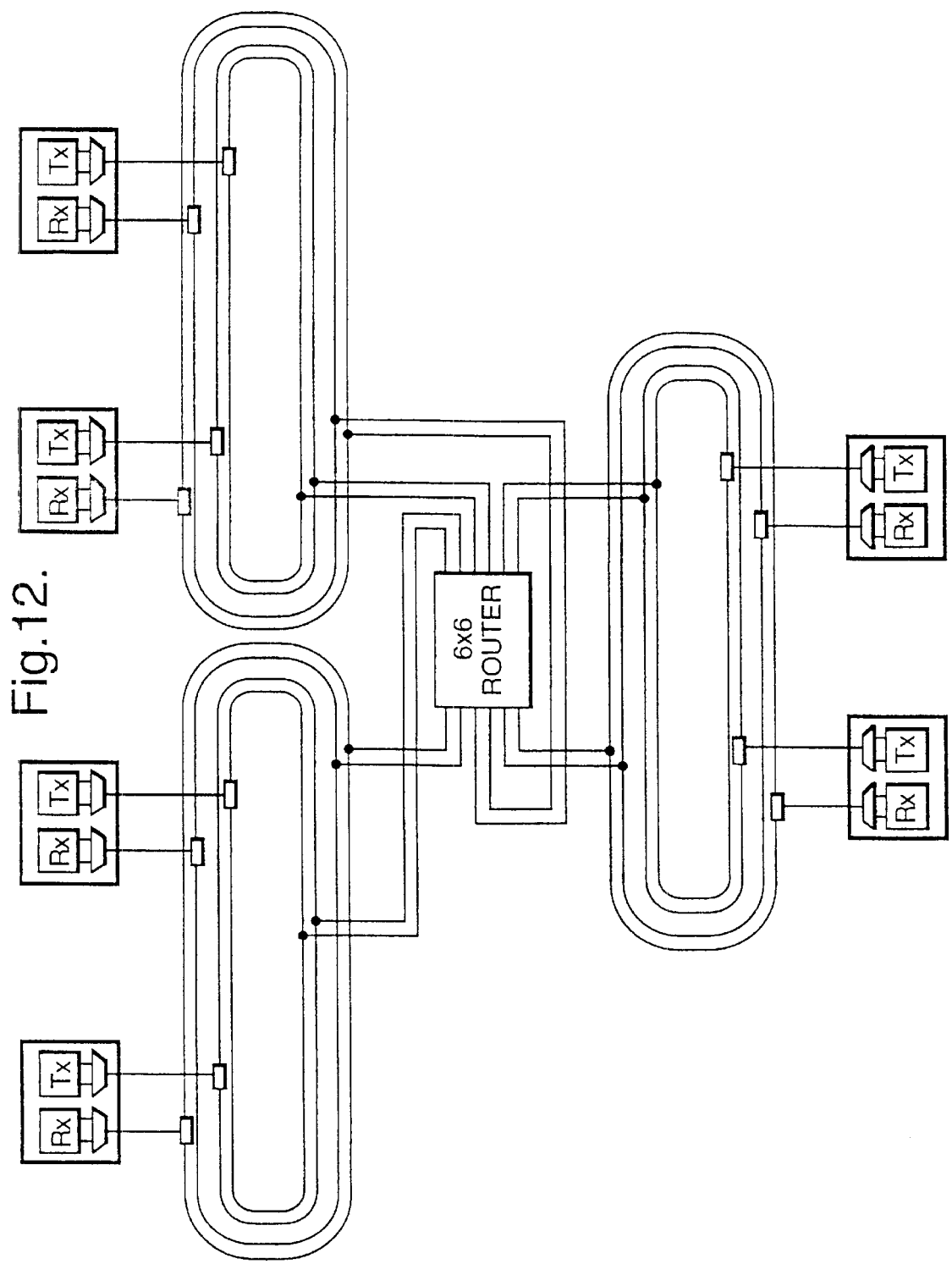
FIG. 12 is a schematic of a further alternative embodiment.

The present invention is by no means limited to networks having a single ring topology, nor to the use of 8×8 configurations. By way of example, FIG. 11 shows an alternative design using two rings 110, 111 with two nodes connected to each sub-ring. As for the single ring of the first example each ring has a duplex structure, with separate loops connecting the node transmitters and receivers respectively. In FIG. 12 three rings are used, with a 6×6 router.

As in previous examples, connections are made via 1×2 switches 112, 50:50 couplers 113 and Mux/Demux units 114.

TABLES

Control and Monitoring Functions

| | PRIORITY | A/D | D/A | D/I | D/O | DETAILS |
|---|---|---|---|---|---|---|
| | | | I/O TYPE | | | |
| Received Tone amplitudes OK? | 1L | | | 8 | | If a received tone amplitude exceeds a certain preset value, this implies the laser wavelength, the dc bias unit and tone circuits are all OK. |
| Oscillator Voltages OK? | 2L(?) | | | 8 | | Oscillators running OK?(What will we monitor here?) |
| Received Tone amplitudes | 2M | 8 | | | | Power level for each laser wavelength after transmission through the Mux |
| Set Tone comparator level | *P | | | | | Set voltage level at which tone amplitude level indicator trips in. |
| TEC Control Voltage OK? | 2L | | | 8 | | Is the TEC control voltage close to zero? |
| TEC Current | 3M | 8 | | | | What is the TEC current at the moment? |
| Thermistor Resistance | 3M | 8 | | | | What is the thermistor resistance? |
| Target Resistance | 3M | 8 | | | | What is the target resistance? |
| Set TEC Target Resistance | 4P | | 8 | | | Set the target resistance (hence the laser wavelength) via a potentiometer. Also external voltage (from computer) can drive temperature over limited range. |
| TEC On/Off Switch | *S | | | | | On/Off Switch for TEC unit. |
| TEC Open Circuit | *L | | | | | LED to indicate the TEC is broken or not connected. |
| TEC Current Limit | *L | | | | | LED to indicate the thermistor in the laser package is broken or not connected? |
| No thermistor connected | *L | | | | | Led to indicate the thermistor in the laser package is broken or not connected? |

TABLES-continued

Control and Monitoring Functions

| | PRIORITY | A/D | D/A | D/I | D/O | DETAILS |
|---|---|---|---|---|---|---|
| Laser Bias currents OK? | 2L | | | 8 | | Is laser bias circuitry working OK (i.e. is the bias current within sensible limits)? |
| Laser Bias currents | 3M | 8 | | | | What are the eight laser bias currents? |
| Laser drive On/Off Switch | *S | | | | | On/Off Switch for laser drive unit. |
| Laser Open circuit | *L | | | | | |
| Laser Short circuit | *L | | | | | |
| Set Laser Bias currents | *P | | | | | Set the laser bias current using a potentiometer. |
| Set amplitude of bias tone | *P | | | | | Set the amplitude of the bias current tone to laser via a potentiometer |
| 2. Mux/Demux Unit | | | | | | |
| 3. Mux/Demux Control Unit | | | | | | |
| Temperature locked OK? | 1 | | | 1 | | Is the crude temperature control loop working properly? |
| X-control loop OK? | 1 | | | 1 | | Is x-control loop locked properly? |
| Y-control loop OK? | 1 | | | 1 | | Is y-control loop locked properly? |
| Thermistor resistance | 2 | 1 | | | | |
| Heating current | 2 | 1 | | | | |
| PZT Voltages | 2 | 2 | | | | |
| Heater current Limit | * | | | | | Has the heater reached the current limit? |
| Open circuit | * | | | | | I |
| No thermistor | * | | | | | Has the thermistor in the mux/demux unit broken or become disconnected? |
| 4. Receiver Unit | | | | | | |
| Signal Level OK? | 1 | | | 8 | | Does the input signal level to the receiver exceed a certain preset value? |
| Photodiode Bias Currents | 2 | 8 | | | | Photodiode bias currents indicate the signal level at the receiver. |
| 5. Switch Unit | | | | | | |
| Input Address | 1 | | | | 4 | |
| Output Address | 1 | | | | 4 | |
| Load/Reset/Configure | 1 | | | | 3 | |
| 6. Router Unit | | | | | | |
| 7. Router Control Unit | | | | | | |
| Ref. Laser control voltage OK? | 1 | | | 1 | | |
| Ref. Laser Bias OK? | 1 | | | 1 | | |
| Ref. Laser Bias Current | 2 | 1 | | | | |
| Ref. Laser Control Voltage | 2 | 1 | | | | |
| Ref. Laser Thermistor Resistance | 3 | 1 | | | | |
| Temperature locked OK | 1 | | | 1 | | Is the crude temperature control loop working properly? |
| X-control loop OK | 1 | | | 1 | | Is x-control loop locked properly? |
| Y-control loop OK | 1 | | | 1 | | Is y-control loop locked properly? |
| Thermistor resistance | 2 | 2 | | | | |
| Heating Current | 2 | 1 | | | | |
| PZT Voltages | 3 | 2 | | | | |
| Heater current Limit | 2 | | | 1 | | Has the heater reached the current limit? |
| Open circuit | * | | | | | |
| No thermistor | * | | | | | |

8. Definition of Priority Levels

| PRIORITY LEVEL | DESCRIPTION |
|---|---|
| 1 | Must monitor/set-up with high priority |
| 2 | Only need to monitor these functions if Priority Level 1 data shows a problem |
| 3 | More detailed diagnostic following a Priority Level 2 interrogation |
| 4 | Low importance diagnostic information - possibly required at a later stage for complete centralised software control |
| * | No need to monitor this function remotely - Local function only |

9. 8 × 8 Routing Table

| | Output Waveguide | | | | | | | |
|---|---|---|---|---|---|---|---|---|
| | 1 | 2 | 3 | 4 | 5 | 6 | 7 | 8 |
| 1 | $\lambda_0$ | $\lambda_1$ | $\lambda_2$ | $\lambda_3$ | $\lambda_4$ | $\lambda_5$ | $\lambda_6$ | $\lambda_7$ |
| 2 | $\lambda_7$ | $\lambda_0$ | $\lambda_1$ | $\lambda_2$ | $\lambda_3$ | $\lambda_4$ | $\lambda_5$ | $\lambda_6$ |

TABLES-continued

Control and Monitoring Functions

| | | | | I/O TYPE | | | | |
|---|---|---|---|---|---|---|---|---|
| | | PRIORITY | A/D | D/A | D/I | D/O | DETAILS | |
| 3 | $\lambda_6$ | $\lambda_7$ | $\lambda_0$ | $\lambda_1$ | $\lambda_2$ | $\lambda_3$ | $\lambda_4$ | $\lambda_5$ |
| 4 | $\lambda_5$ | $\lambda_6$ | $\lambda_7$ | $\lambda_0$ | $\lambda_1$ | $\lambda_2$ | $\lambda_3$ | $\lambda_4$ |
| 5 | $\lambda_4$ | $\lambda_5$ | $\lambda_6$ | $\lambda_7$ | $\lambda_0$ | $\lambda_1$ | $\lambda_2$ | $\lambda_3$ |
| 6 | $\lambda_3$ | $\lambda_4$ | $\lambda_5$ | $\lambda_6$ | $\lambda_7$ | $\lambda_0$ | $\lambda_1$ | $\lambda_2$ |
| 7 | $\lambda_2$ | $\lambda_3$ | $\lambda_4$ | $\lambda_5$ | $\lambda_6$ | $\lambda_7$ | $\lambda_0$ | $\lambda_1$ |
| 8 | $\lambda_1$ | $\lambda_2$ | $\lambda_3$ | $\lambda_4$ | $\lambda_5$ | $\lambda_6$ | $\lambda_7$ | $\lambda_0$ | where $\lambda_K = \lambda_0 + k\Delta\lambda$

What is claimed is:

1. An optical network comprising:

N nodes,

N optical waveguide transmission rings, and

N optical waveguide reception rings;

each of said nodes comprising an optical transmitter operative on a WDM of N wavelengths and an optical receiver operative on a WDM of N wavelengths each of said transmission rings being connected to a WDM transmitter of one of said nodes and each of said reception rings being connected to a WDM receiver of one of said nodes, wherein the optical network also comprises a wavelength responsive N×N WDM router having N input ports and N output ports, each of said input ports being connected to one of said transmission rings and each of said output ports being connected to one of said reception rings, said WDM router providing a path determined by wavelength from each of said input ports to each of said output ports.

2. The network according to claim 1, wherein the nodes use internal wavelength division multiplexing.

3. The network according to claim 1, wherein said transmission rings are used solely for transmission and said reception rings are used solely for reception.

4. The network according to claim 1, wherein each of the N optical waveguide transmission rings includes A 1×2 switch.

5. The network according to claim 1, wherein each of the N optical waveguide reception rings includes a 1×2 switch.

6. An optical network operative on a wavelength division multiplex of N wavelengths, said network comprising:

a) N nodes each comprising a WDM optical transmitter operative on said N wavelengths and a n M optical receiver operative on said N wavelengths, b) N optical waveguide transmission rings, c) N optical waveguide reception rings, and d) an N×N WDM router individually responsive to each of the N wavelengths of said multiplex, said router having N input ports, N output ports and providing a path determined by wavelength from each of said input ports to each of said output ports;

wherein each of said transmission rings is connected to the WDM transmitter of one of said nodes, each of said reception rings is connected to the WDM receiver of one of said nodes, each input port of the router is connected to one of said transmission rings, and each output port of the router is connected to one of said reception rings.

7. The network according to claim 6, wherein the nodes use internal wavelength division multiplexing.

8. The network according to claim 6, wherein said transmission rings are used solely for transmission and said reception rings are used solely for reception.

9. The network according to claim 6, wherein each of the N optical waveguide transmission rings includes a 1×2 switch.

10. The network according to claim 6, wherein each of the N optical waveguide reception rings includes a 1×2 switch.

* * * * *